United States Patent [19]

László

[11] Patent Number: 5,109,182

[45] Date of Patent: Apr. 28, 1992

[54] METHOD OF MANUFACTURING INCANDESCENT LAMPS WITH HALOGEN, PARTICULARLY FLUORINE FILLING AND INCANDESCENT LAMP MANUFACTURED BY THE METHOD

[75] Inventor: Zoltán László, Budapest, Hungary

[73] Assignee: Tungsram Reszvenytarsasag, Hungary

[21] Appl. No.: 505,842

[22] Filed: Apr. 6, 1990

[30] Foreign Application Priority Data

Apr. 14, 1989 [HU] Hungary ............... 1845/89

[51] Int. Cl.$^5$ ............................................. H01K 1/50
[52] U.S. Cl. ..................... 313/572; 313/579; 313/635; 313/637; 445/57
[58] Field of Search ............... 313/569, 579, 638–641, 313/637, 572; 445/16, 17, 53, 57, 56, 26, 59

[56] References Cited

U.S. PATENT DOCUMENTS

| | | | |
|---|---|---|---|
| 3,901,573 | 8/1975 | Dolenga et al. | 445/57 |
| 4,005,324 | 1/1977 | Dolenga et al. | 445/53 |
| 4,090,101 | 5/1978 | Rees et al. | 313/579 |
| 4,256,988 | 3/1981 | Coaton et al. | 313/635 |
| 4,578,043 | 3/1986 | Teshima et al. | 445/57 |
| 4,647,821 | 3/1987 | Lapatovich et al. | 313/637 |
| 4,659,318 | 4/1987 | Bunk et al. | 445/57 |
| 4,743,802 | 5/1988 | Connor et al. | 313/579 |

*Primary Examiner*—Michael Razavi
*Attorney, Agent, or Firm*—Handal & Morofsky

[57] ABSTRACT

In a method of manufacturing incandescent lamps with halogen, particularly fluorine filling comprising the steps of preparing a body of an incandescent lamp, the body consisting of an envelope made of a translucent material, an incandescent filament arranged within the envelope on supporting means, current lead-in members and a sucking pipe communicating with the inner space of the envelope, evacuating the inner space to a pressure from about 4 Pa to about 5 Pa by the means of a pumping system connected with the sucking pipe, introducing into the inner space a filling comprising an inert gas and a halogen element, ensuring thereby inner pressure about $10^5$ Pa within the envelope, closing the sucking pipe for separating the body from the pumping system, and carrying out the evacuating process with a stop at an intermediate pressure, heating up the body to a temperature in the range from about 500° C. to about 600° C. and then continuing the evacuating process. In the incandescent lamp of the invention the inner space of the envelope comprises carbon essentially in the amount ensured by an organic compound added to the filling for introducing the required amount of the halogen element.

9 Claims, No Drawings

METHOD OF MANUFACTURING INCANDESCENT LAMPS WITH HALOGEN, PARTICULARLY FLUORINE FILLING AND INCANDESCENT LAMP MANUFACTURED BY THE METHOD

FIELD OF INVENTION

The present invention refers to a method of manufacturing incandescent lamps with halogen, particularly fluorine filling and an incandescent lamp manufactured by the method proposed. According to the method of the invention a body of an incandescent lamp is prepared, the body consisting of an envelope made of a translucent material, an incandescent filament arranged within the envelope on supporting means, current lead-in members and a sucking pipe communicating with the inner space of the envelope, then the steps of evacuating the inner space to a pressure from about 4 Pa to about 5 Pa by the means of a pumping system connected with the sucking pipe, introducing into the inner space a filling comprising an inert gas and a halogen element for ensuring inner pressure about $10^5$ Pa within the envelope and closing the sucking pipe for separating the body from the pumping system are carried out. The incandescent lamp comprises a body consisting of an envelope made of a translucent material, an incandescent filament arranged within the envelope on supporting means, current lead-in members for connecting the incandescent filament with an outer voltage source and a sucking pipe for communicating inner space with the envelope during manufacturing, the envelope receiving a filling having pressure about $10^5$ Pa and including an inert gas and a halogen element.

BACKGROUND OF THE INVENTION

The idea of prolongating the useful life period of an electric incandescent lamp by introducing a regenerative gas comprising a halogen element into the envelope of the lamp has been recognized since relatively long time. The practical realization of this idea, however, have never given the desired result. In the middle of the fifties the first types of the incandescent lamps comprising halogen filling were introduced to the market, as it was described in the article of R. Burgin ("The development of tungsten filament lamps" in Lighting Research and Technology, 16, 2, 1984, p. 69). In the very first period of manufacturing the incandescent lamps comprising a halogen filling the regenerative gas was iodine. The so-called iodine lamps were shown among other documents in the DE-PS 12 46 874 specifying the state of the art for the year 1955. The halogen elements exert their influence in the inner space of the incandescent lamp by a so-called halogen cyclic process. The theoretical thermodynamical basis of this process was investigated and resulted in creating the theory of incandescent lamps comprising a regenerative gas based on other halogen elements, especially bromine. In the mentioned article of R. Burgin (p. 71) the statement can be found that the development and manufacturing of the incandescent lamps having fluorine filling could not be realized because of unsolvable difficulties.

The theory says the application of fluorine instead of other halogen elements (bromine, iodine) used up to the present days should be very advantageous because it results in a supposed prolongation of the useful life period. Such statements can be found among other in the following publications: "Beispiele aus der Fluorchemie und Möglichkeiten zur technischen Anwendung" in Philips' Technische Rundschau, 1963/64, 10/11, pp. 359 to 365 and "Die Fluor-Lampe-eine bemerkenswerte Entwicklung zur Verbesserung der Lichtausbeute und Lichtdichte von Glühlampen" in Kino-Technik, 1965, 2, pp. 29 to 30.

The advantages theoretically coupled with the fluorine lamps have always stimulated the skilled artisans to elaborate different solutions disclosed later in patent specifications referring to the methods of manufacturing incandescent lamps with fluorine filling, to the possibilities of application different fluorine compounds.

The fluorine lamps, i.e. the incandescent lamps having gaseous filling comprising fluorine have not satisfied in the reality the expectations following from the theoretical forecasts as for their long useful life period. Even to the contrary to the forecasts the lamps demonstrated many drawbacks: their useful life period was short, the envelope blackened quickly. The short useful life period was caused by the fact that fluorine attached the glass envelope and transformed the incandescent filament to a fragile element. These problems were intended to be solved by application different halogen elements (especially bromine and iodine) together with the fluorine, as proposed in the DE-OS 12 51 433 or HU-PS 159 001, by modifying the noble gas part of the filling through introducing helium, as shown in the U.S. Pat. No. 3,974,413, by introducing the halogen element, i.e. the flurine in the form of halogenated silicon compounds, particularly halogenated silanes in order to form a protecting silicon layer on the inner surface of the envelope, the layer consisting of elementary silicon resulted from the decomposition of the compounds introduced, as illustrated by the DE-OS 19 59 612. It should be noted that in the U.S. Pat. No. 3,783,328 a solution is proposed according to which the filling including a noble (inert) gas and fluorine is completed by adding oxygen in equimolar amount.

The publications mentioned above illustrate the manifold endeavours of finding out a correct solution for practical realization of the fluorine lamps supposably offering different important advantages. The problems have remained, however, unsolved: on the market practically no incandescent lamp can be found which comprises a filling comprising fluorine as halogen component.

SUMMARY OF THE INVENTION

The present invention is intended to offer a solution to the problem mentioned above.

Hence, the object of the invention is to create a method of manufacturing incandescent lamps comprising in their gasous filling a halogen compound, especially fluorine, the method being applicable in industrial conditions for mass production of the incandescent lamps. A further object is to make use of the advantages promised by the theoretical investigations, i.e. to prolongate the useful life period of the incandescent lamps and increase their light efficiency.

Another object of the present invention is to improve the general technology of manufacturing the incandescent lamps made with a filling comprising at least one halogen element and to improve the quality of the incadescent lamps of this category by introducing modifications on the basis of the experience offered by the present invention.

Investigating the factors why the known methods of manufacturing the incandescent lamps comprising fluorine in their gaseous filling have been unsuccessful the recognition could be made that the halogen cycle process undergoes interrupting shortly after the beginning of the application of the incandescent lamp. The halogen cycle process should operate on the following way: the tungsten evaporating from the incandescent filament condensates on the inner surface of the glass envelope and the halogen element forms with it a gaseous substance which transports it back to the body of the incandescent filament. If the process were impossible tungsten remains and accumulates on the surface and the early blackening of the envelope is observed. The recognition can be capitulated that in the industrial environment of manufacturing the incandescent lamps some contamination is always present and in the pumping process a little amount of organic compounds always gets into the inner space of the envelope which organic compounds bind fluorine being present in relatively small amount in the lamp, especially because of high activity of the fluorine. This is the basis why the halogen cycle process undergoes practically always interruption after short time elapsed from setting the incandescent lamp to operate. Of course, it is possible to introduce a surplus amount of fluorine into the inner space of the closed vessel of the incandescent lamp, but this can be harmful: the free fluorine makes the incandescent body fragile and the fragility results in shortening of the useful life period.

The recognition illustrated above can be translated into the requirements of the manufacturing technology thereby that the step of cleaning the inner space of the vessel from the organic and carbon containing impurities should be carried out; by the means of a simple operation the impurities of this kind can be removed.

Thus, the invention proposes a method of manufacturing incandescent lamps with halogen, particularly fluorine filling comprising the steps of preparing a body of an incandescent lamp, the body consisting of an envelope made of a translucent material, an incandescent filament arranged within the envelope on supporting means, current lead-in members and a sucking pipe communicating with the inner space of the envelope, evacuating the inner space to a pressure from about 4 Pa to about 5 Pa (substantially about $10^{-2}$ torr) by the means of a pumping system connected with the sucking pipe, introducing into the inner space a filling comprising an inert gas and a halogen element, ensuring thereby inner pressure about $10^5$ Pa (substantially 1 atm or about 1 bar) within the envelope and closing the sucking pipe for separating the body from the pumping system, with the improvement of carrying out the evacuating process with a stop at an intermediate pressure, advantageously in the range from about 15 Pa to about 200 Pa (substantially from about 0.1 torr to about 1.5 torr) and more preferred from about 45 Pa to about 150 Pa (substantially from about 0.3 torr to about 1.1 torr) heating up the body for a short time, especially for a time period from about 30 sec to about 60 sec to a temperature sufficient for burning out carbon, especially in the range from about 500° C. to about 600° C. and then continuing the evacuating process.

In an especially advantageous embodiment of the method of the invention a filling comprising a noble gas, particularly krypton or argon of partial pressure about $10^5$ Pa and a gaseous fluorocarbon, preferably freon of general formula $CCl_2F_2$ of partial pressure about 133 Pa is applied.

The method can advantageously be realized with a filling comprising a mixture of nitrogen and the noble gas, particularly krypton or argon.

The method of the invention can be realized in a preferred manner by introducing into the filling bromine as the halogen element in the form of methyl bromide or methylene bromide and as a noble gas argon or krypton.

The present invention proposes further an incandescent lamp, comprising a body consisting of an envelope made of a translucent material, an incandescent filament arranged within the envelope on supporting means, current lead-in members for connecting the incandescent filament with an outer voltage source and a sucking pipe for communicating inner space with the envelope during manufacturing and a filling of pressure substantially about $10^5$ Pa (1 bar) and comprising an inert gas and a halogen element, wherein the inner space of the envelope comprises carbon essentially in the amount ensured by an organic compound added to the filling for introducing the required amount of the halogen element.

The fluorine lamps manufactured according to the invention proposed by the invention show a sharp improvement of the life period when compared to the incandescent lamps of the same category manufactured according to the methods which have become known from the art.

The invention will be further described in more detail with reference to some preferred embodiments of the method and to examples showing some practical realizations.

DETAILED DESCRIPTION OF THE INVENTION AND PREFERRED EMBODIMENTS

The method proposed according to the present invention is applied during the process of manufacturing incandescent lamps of known designs. This means, by making use the known methods of the art the body of an incandescent lamps is prepared. This body comprises, as usual, in an envelope made of a translucent material, especially glass, an incandescent filament supported on appropriate carrier members, and current lead-in means for connecting the incandescent filament with an outer current supply. This body is equipped according to the general practice with a sucking pipe for assuring communication between a pumping system and the inner space of the envelope. The envelope of the body is then evacuated through the sucking pipe by the means of the pumping system up to an end pressure generally lying in the range at most from about 4 Pa to about 5 Pa (substantially in the range around at most 0.01 torr). Thereafter the envelope is hermetically sealed by closing the interior of the sucking pipe (melting and pressing its glass material).

The essence of the invention lies in evacuating the inner space of the envelope in two steps: firstly to an intermediate pressure exceeding at least three times the end pressure, and, obviously lying under the pressure of the environment, advantageously being in the range of about 15 Pa to about 200 Pa (substantially from about 0.1 torr to about 1.5 torr), and more advantageously in the range from about 40 Pa to about 150 Pa (substantially from about 0.3 torr to about 1.1 torr). This pressure range is according to the experience high enough for ensuring the amount of oxygen necessary for burning out the carbon impurities present in the envelope because of the environment of manufacturing and with regard to the pumping system generally operating with oil. The carbon impurities generally mean organic compounds.

After reaching the intermediate pressure the step of heating up the body for a short time follows. This is ensured by ensuring conditions wherein the incandescent body shows slightly red colour because of limited glowing. The advantageous temperatures lie in the range from about 500° C. to about 600° C. and when the heating up lasts from about 30 sec to about 60 sec this is sufficient for substantially burning out any carbon present in the envelope. Obviously, the temperature and time range of the heating-up step depends on the given conditions, the requirement is that the carbon impurities and especially the organic remainings should be practically fully removed from the envelope.

After this step the second step of the evacuating process follows: by continued sucking ensured by the means of the pumping system connected with the sucking pipe the pressure is lowered up to the required end pressure. Then the operation of introducing into the inner space a filling comprising an inert gas and a halogen element is carried out and the inner space is filled up to reaching the inner pressure about $10^5$ Pa within the envelope. Thereafter the sucking pipe is closed by applying heat for separating the body from the pumping system and sealing it. The filling generally comprises a noble gas, generally argon and/or krypton and sometimes nitrogen, the inert component having partial pressure about $10^5$ Pa and a gaseous fluorocarbon of partial pressure about 133 Pa. Advantageously, the gaseous fluorocarbon is consisted of freon of general formula $CCl_2F_2$.

It is also preferred to apply methyl bromide and/or methylene bromide as source of the halogen element and argon and/or krypton as the noble gas of the filling.

In the incandescent lamp of the invention the full amount of the carbon is practically burned out during the first step of the evacuating process and therefore the inner space of the envelope comprises carbon essentially only in the amount ensured by an organic compound, e.g. by the freon added to the filling for introducing the required amount of the halogen element.

If the method depicted above is not applied, the blackening of the envelopes of the incandescent lamps can be experienced. This process begins from appearance of black spots having sharp boundaries, the spots tending to increase. The inner surface of the vessel is likely not homogeneous and this is the basic feature resulting in the appearance of the spots. According to the recognition the inhomogeneity is generated by the presence of rather organic impurities, e.g. oil spots. The pumping system comprising an oil pump can be the source of impurities mentioned. The inner wall of the envelope is cleaned by the proposed heating step carried out for turning the impurities into carbon dioxide and other combustion products which can be removed from the inner space of the envelope by the second step of the evacuating process.

During operation of the incandescent lamp the halogen element introduced into the inner space of the envelope reacts with tungsten evaporating from the incandescent filament and moving toward the inner wall. The metallic tungsten forms with fluorine tungsten hexafluoride which is present in gaseous form and carries tungsten back to the incandescent body. The fluorine necessary in this cycle process is bound when according to the art the organic or other carbon containing compounds are not removed from the envelope because the evacuating process is ensured without stop and the proposed heating step. Thus, the remainings on failing to carry out the burning step can constitute a carbon source and render a chemical reaction possible whereby a fluorine-containing compound appears which binds the fluorine, stopping thereby the halogen cyclic process depicted above.

After the evacuating step one or more organic compounds can be introduced into the inner gas space of the envelope, but in this case carbon is there present substantially in a stoichiometric proportion only, according to its part in the compound. If the incandescent lamp is dopped with fluorine by the means of freon of the general formule $CCl_2F_2$ then the amount of the carbon in the envelope is substantially equal to that which follows from the formula, i.e. the carbon level within the envelope is substantially fully determined by the amount of the halogen-containing organic compound(s) added to the filling of the incandescent lamp, it can be slightly under or above the mentioned amount.

By the means of the method proposed according to the present invention some incandescent lamps comprising halogen filling were prepared and investigated for long term operating in order to determine their useful life period. The lamps met fully the requirements as it demonstrated by the examples given below.

EXAMPLE 1

A photographic lamp of power input 1000 W for 225 V supply voltage was prepared with filling comprising krypton of pressure about $10^5$ Pa and gaseous freon of formula $CCl_2F_2$ having pressure about 133 Pa (1 torr).

The lamp ensured light intensity about 25,000 lm at colour temperature about 3200° K.

The lamp manufactured according to the method proposed by the present invention could be applied over 400 hours. The similar photographic lamp manufactured according to the art and containing practically no fluorine in the filling has useful life time 200 hours (according to the catalogue).

EXAMPLE 2

The photographic lamp of Example 1 was prepared with the difference the lamp ensured light intensity about 33,000 lm at colour temperature about 3400° K. and the filling comprised argon instead of krypton. The pressure values were the same and as source of the halogen element freon ($CCl_2F_2$) was applied also at pressure 133 Pa.

The lamp manufactured according to the method proposed by the present invention could be applied over 30 hours. The similar normal photographic lamp manufactured according to the art and containing practically no fluorine in the filling has useful life time 15 hours (according to the catalogue).

What I claim is:

1. A method of manufacturing incandescent halogen lamps comprising the steps of:
    providing an incandescent lamp body having a translucent envelope, an incandescent filament supported within said envelope, current lead-in members and a vent pipe communicating with the inner space of said envelope;

evacuating said envelope in a first step to an intermediate pressure of from about 15 to about 200 Pa;

heating said lamp body for a short time to a temperature in the range from about 500° C. to about 600° C. in the presence of an oxidizing atmosphere at said intermediate pressure of from about 15 to about 200 Pa so as to burn out substantially any carboniferous contaminants present in said envelope;

continuing said evacuation in a second step to an end pressure of from about 4 Pa to about 5 Pa by means of a pumping system connected with said vent pipe;

introducing into said envelope a fill gas comprising an inert gas and a halogen-providing material to produce a pressure of about $10^5$ Pa within said envelope;

and sealing said vent pipe.

2. The method as set forth in claim 1, wherein said heating step is carried out with duration of from about 30 seconds to about 60 seconds.

3. The method as set forth in claim 1, wherein said fill gas comprises a halogen—providing substance in the form of a compound selected from the group consisting of methyl bromide and methylene bromide and a noble gas selected from the group consisted of argon and krypton.

4. The method as set forth in claim 1, wherein the halogen is fluorine.

5. The method as set forth in claim 1, wherein said filament comprises tungsten.

6. A method of manufacturing incandescent halogen lamps comprising the steps of:

providing an incandescent lamp body having a translucent envelope, an incandescent filament supported within said envelope, current lead-in members and a vent pipe communicating with the inner space of said envelope;

evacuating said envelope in a first step to an intermediate pressure of from about 15 to about 200 Pa;

heating said lamp body for a short time to a temperature in the range from about 500° C. to about 600° C. in the presence of an oxidizing atmosphere at said intermediate pressure of from about 15 to about 200 Pa so as to burn out substantially any carboniferous contaminants present in said envelope;

continuing said evacuation in a second step to an end pressure of from about 4 Pa to about 5 Pa by means of a pumping system connected with said vent pipe;

introducing into said envelope a fill gas which comprises a noble gas at a partial pressure of about $10^5$ Pa selected from the group consisting of krypton and argon and a gaseous fluorocarbon of partial pressure about 133 Pa;

and sealing said vent pipe.

7. The method as set forth in claim 6, wherein said gaseous fluorocarbon consists of freon of general formula $CCl_2F_2$.

8. The method as set forth in claim 6, wherein said fill gas comprises a mixture including nitrogen together with said nobel gas.

9. An incandescent halogen lamp produced by a method comprising the steps of:

providing an incandescent lamp body having a translucent envelope, an incandescent tungsten filament supported within said envelope, current lead-in members and a vent pipe communicating with the inner space of said envelope;

evacuating said envelope in a first step to an intermediate pressure of from about 15 to about 200 Pa;

heating said lamp body for a short time to a temperature in the range from about 500° C. to about 600° C. in the presence of an oxidizing atmosphere at said intermediate pressure of from about 15 to about 200 Pa so as to burn out substantially any carboniferous contaminants present in said envelope;

continuing said evacuation in a second step to an end pressure of from about 4 Pa to about 5 Pa by means of a pumping system connected with said vent pipe;

introducing into said envelope a fill gas comprising an inert gas and a halogen-providing material to produce a pressure of about $10^5$ Pa within said envelope;

and sealing said vent pipe.

* * * * *